Dec. 1, 1925.
A. G. LARSON
HINGE
Filed Feb. 14, 1924
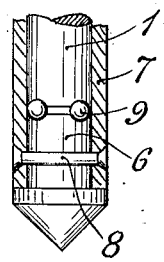
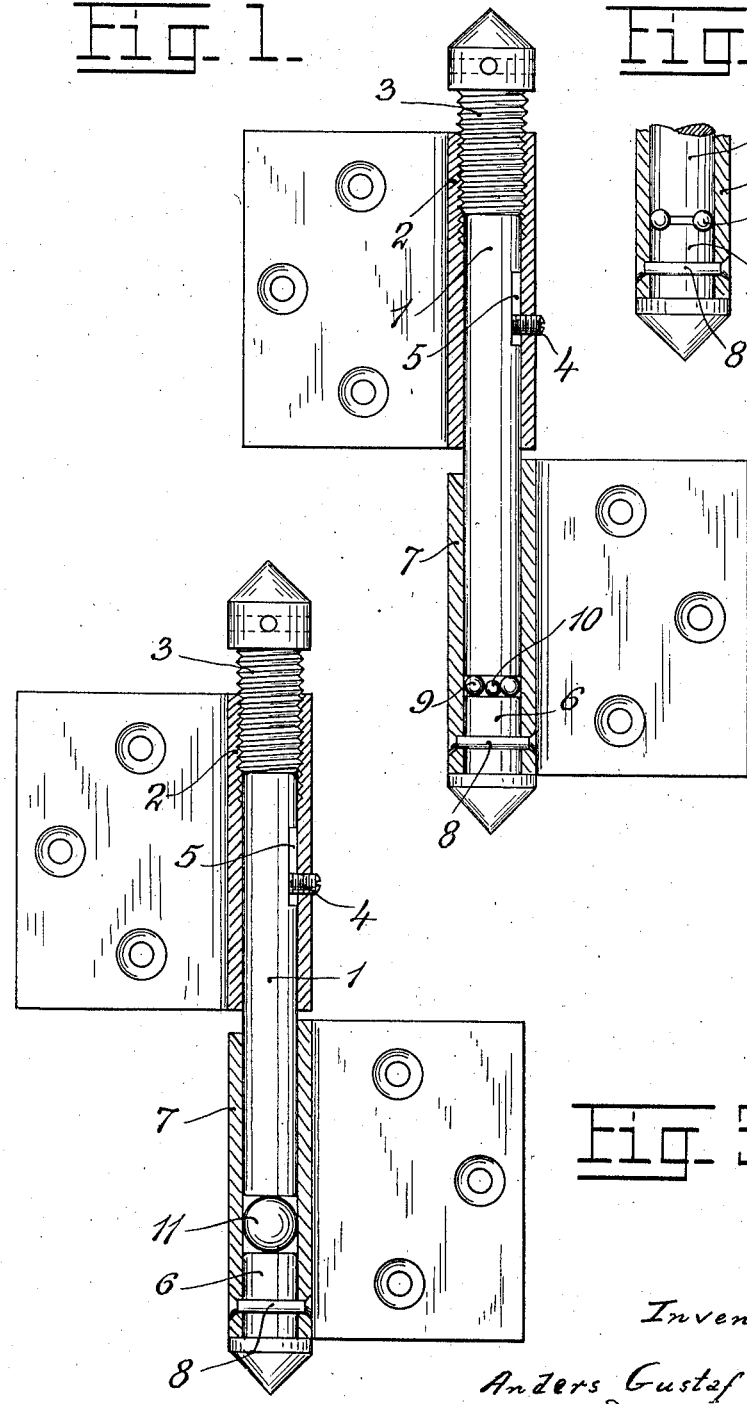
Inventor:
Anders Gustaf Larson
By [signature]
Attorney.

Patented Dec. 1, 1925.

1,563,869

UNITED STATES PATENT OFFICE.

ANDERS GUSTAF LARSON, OF CHRISTIANIA, NORWAY.

HINGE.

Application filed February 14, 1924. Serial No. 692,803.

*To all whom it may concern:*

Be it known that I, ANDERS GUSTAF LARSON, a subject of the King of Norway, residing at Prinsensgate 3b, Christiania, Norway, have invented certain new and useful Improvements in Hinges; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to hinges, especially door hinges, the object of my invention being to provide a door hinge that is easily adjustable, is provided with a simple but effective ball bearing, and is normally locked against unpremeditated dislodgment of its parts.

In the following the invention is to be described with reference to the accompanying drawings, illustrating different embodiments of the invention.

Fig. 1 is a side view, partly in section, of a complete hinge,

Fig. 2 illustrates, partly in section, a ball bearing as it will be after some wear.

Fig. 3 is a side view, partly in section, of a hinge with a ball bearing comprising a single ball only.

As shown in the drawings, the hinge comprises two leaves provided, as usual, with superposed sockets 2 and 7 for the reception of the pintle 1. The latter is plain-surfaced or unthreaded throughout its entire extent, and its lower end rests directly upon a thrust ball-bearing which is itself supported directly upon the upper end of a short plug bolt 6 secured in the bottom of the lower socket 7 by means of a cross-pin 8. The aforesaid bearing may consist of a plurality of steel balls 9 and a slightly smaller central ball 10 (Fig. 1) or, if preferred, of a single ball 11 only (Fig. 3); the ball 11 being suitably dimensioned to fit snugly in socket 7.

The upper part of the pintle projects into the upper socket 2 but terminates some distance short of the upper end thereof, the space above the pintle end being occupied by a second plug bolt 3. This bolt 3 is threaded, as shown, and the portion of the socket wherein it is designed to fit is likewise threaded so that said bolt can therefore be adjusted so as to bear upon the pintle end. The pintle fits loosely in the two sockets 2 and 7 and is capable of vertical movement therein, but is held against rotation by a detent, here shown as a screw 4 which is inserted through a hole in the wall of the socket 2 and projects into a longitudinal groove 5 formed in the surface of the pintle.

In the course of time the balls 9 will wear out grooves in the end faces of the pintle 1 and bolt 6 as illustrated in Fig. 2, and for this reason it is quite indispensable for a hinge with a ball bearing that it be easily and accurately adjustable, and it is probably due to this fact having been overlooked that door hinges running on ball bearings have not hitherto come into general use.

It will be understood that constructional variations from the above forms may be made within the scope of the invention. So for instance the parts 1 and 3 may be made integral with each other.

I claim as my invention—

In a hinge, the combination of a pair of leaves provided with superposed sockets, the upper socket having the upper portion of its internal surface formed with screw threads and the lower portion of said surface plain, and the lower socket having a plain internal surface; a plug bolt secured in the bottom of said lower socket; a plain-surfaced pintle fitting loosely in the lower socket and in the plain portion of the upper socket and having a longitudinal groove formed in its surface; a retaining pin projecting loosely into said groove at its inner end and mounted in the adjacent socket so as to hold the pintle against rotation while permitting its vertical movement; a thrust ball-bearing supported upon the plug bolt and whereon the lower end of the pintle directly rests; and a screw-threaded plug bolt adjustably engaged in the threaded upper portion of the upper socket and directly engaging the upper end of the pintle.

In testimony that I claim the foregoing as my invention, I have signed my name.

ANDERS GUSTAF LARSON.